Feb. 6, 1962 R. J. GARRISON ET AL 3,020,525

RECORD CONTROLLED TRANSLATOR

Filed April 4, 1958 7 Sheets-Sheet 1

INVENTORS R.J. GARRISON
E.W. HENCHES
G. SPIRO

BY Donald M. Duft

ATTORNEY

| CARD DIGIT | TELEGRAPH CODE | | | | |
|---|---|---|---|---|---|
| | 1 | 2 | 3 | 4 | 5 |
| 0 | | X | X | | X |
| 1 | X | X | X | | X |
| 2 | X | X | | | X |
| 3 | X | | | | |
| 4 | | X | | X | |
| 5 | | | | | X |
| 6 | X | | X | | X |
| 7 | X | X | X | | |
| 8 | | X | X | | |
| 9 | | | | X | X |

INVENTORS R.J. GARRISON
E.W. HENCHES
G. SPIRO
BY
Donald M. Duft
ATTORNEY

Feb. 6, 1962 R. J. GARRISON ETAL 3,020,525

RECORD CONTROLLED TRANSLATOR

Filed April 4, 1958 7 Sheets-Sheet 3

INVENTORS R.J. GARRISON
E.W. HENCHES
G. SPIRO

BY Donald M Duft

ATTORNEY

Feb. 6, 1962 R. J. GARRISON ETAL 3,020,525

RECORD CONTROLLED TRANSLATOR

Filed April 4, 1958 7 Sheets-Sheet 4

INVENTORS R.J. GARRISON
E.W. HENCHES
G. SPIRO

BY Donald M Duft

ATTORNEY

INVENTORS R.J. GARRISON
E.W. HENCHES
G. SPIRO
BY
Donald M Duft
ATTORNEY

Feb. 6, 1962 R. J. GARRISON ETAL 3,020,525

RECORD CONTROLLED TRANSLATOR

Filed April 4, 1958 7 Sheets-Sheet 6

INVENTORS R.J. GARRISON
E.W. HENCHES
G. SPIRO

BY Donald M Duft
ATTORNEY

Feb. 6, 1962 R. J. GARRISON ETAL 3,020,525

RECORD CONTROLLED TRANSLATOR

Filed April 4, 1958 7 Sheets-Sheet 7

INVENTORS R.J. GARRISON
E.W. HENCHES
G. SPIRO

BY Donald M. Duft
ATTORNEY

United States Patent Office 3,020,525
Patented Feb. 6, 1962

3,020,525
RECORD CONTROLLED TRANSLATOR
Richard J. Garrison, Dumont, N.J., and Eugene W. Henches, New York, and George Spiro, Seaford, N.Y., assignors to American Telephone and Telegraph Company, a corporation of New York
Filed Apr. 4, 1958, Ser. No. 726,545
15 Claims. (Cl. 340—172.5)

This invention pertains to a translator and, more particularly, to a translator which simultaneously receives input information pertaining to a plurality of digits in a first code form and, in response thereto, converts this information into a second code form and applies it to an output circuit in sequential form, digit by digit.

The growing use of data transmission systems, data processing systems, and computers greatly increases the need for improved translator circuits which can convert information from one code form to another. For example, many computers utilize translators which convert data from a decimal to a binary code. Also, many telephone systems utilize translators which convert the digital information dialed by the subscribers into other codes, such as for example, two-out-of-five, multifrequency, et cetera.

Translators vary in the manner in which they receive and transmit information. Many receive input information sequentially, translate it into a desired code, and sequentially apply the translated information to an output circuit. Other translators receive input information sequentially, translate it, and store it in a memory device until all the information pertaining to a given problem is received. At this time, the translated information is simultaneously applied to the output circuit of the translator.

The present invention differs from these translators, among other ways, in that it simultaneously receives input information pertaining to a plurality of digits, translates them into a different code form, stores the translated information, and then sequentially applies it to an output circuit.

More specifically, the present invention discloses a translator, which simultaneously receives information in Hollerith code form pertaining to a plurality of digits, translates it into telegraphic code form, stores the translated information, and then sequentially applies it to an output circuit for perforation on a paper tape.

It is therefore an object of this invention to provide an improved translator.

It is a further object of the invention to provide a translator which converts data from the Hollerith code into a teletypewriter code.

It is a further object of the invention to provide an improved translator which receives simultaneous information in Hollerith code form, translates it into a telegraphic code and sequentially applies the translated information to an output circuit.

The present invention is intended for use in a system known in the art as a card-to-tape converter and which converts data from business machine cards to paper tape. Since the information on the business card is perforated in the Hollerith code, it is necessary that it be first translated into telegraphic code form before it can be perforated on a tape. This conversion is accomplished by the translator comprising the present invention. In the presently disclosed system, the information pertaining to the plurality of digits on the card is simultaneously fed to the translator which, after receiving it, converts it to teletypewriter code form and stores it in a memory unit. The stored information is then read out of the memory unit sequentially, digit by digit, and fed to a paper tape perforator.

A feature of the invention is the provision of a translator which simultaneously receives information in a first code form pertaining to a plurality of digits and, in response thereto, translates it into a different code and then sequentially applies it to an output circuit digit by digit.

A further feature of the invention is the provision of a translator which simultaneously receives information in Hollerith code form pertaining to a plurality of digits and, in response thereto, translates it into a different code form, and sequentially applies the translated information pertaining to each digit to an output circuit.

A further feature of the invention is the provision of a system including a translator which reads a perforated record containing information in Hollerith code form, simultaneously applies said information to said translator which translates it into a different code and sequentially applies the translated information pertaining to each digit to an output circuit.

A further feature of the invention is the provision of an improved translator which simultaneously receives information pertaining to a plurality of digits and, in response thereto, translates it into a different code form, and controls the sequential recording of this translated information onto an output medium.

A further feature of the invention is the provision of an improved translator which simultaneously receives information in a Hollerith code form pertaining to a plurality of digits, and in response thereto, translates it into a different code form and controls the sequential perforation of this translated information onto a paper tape.

A further feature of this invention is the provision of an improved translator which simultaneously receives information in Hollerith code form pertaining to a plurality of digits and in response thereto, translates it into telegraphic code and stores it in a first memory circuit which then controls the sequential recording of this translated information on an output medium while a second storage device receives additional translated information which it causes to be recorded on the output medium after the information from the first storage device has been recorded.

Each column on the card may represent one of digits 0 through 9 by a perforation in the row corresponding to the numerical value of the digit. No column is left blank and columns not representing significant digits are perforated with a zero. Therefore, each column of a correctly perforated card will have one and only one perforation therein. The presence of two perforations in a single column or no perforation in a column indicates a trouble condition. Circuits are provided to detect the presence of either of these two trouble conditions.

Accordingly, a further feature of the invention is the provision of a circuit which detects the presence of any unperforated card columns.

A further feature of the invention is the provision of a circuit for detecting the presence of two perforations in a single card column.

These and other objects and features of the invention may be more readily understood when taken in connection with the following description and drawings disclosing an exemplary embodiment of the invention in which.

Figures 2A, 2B:
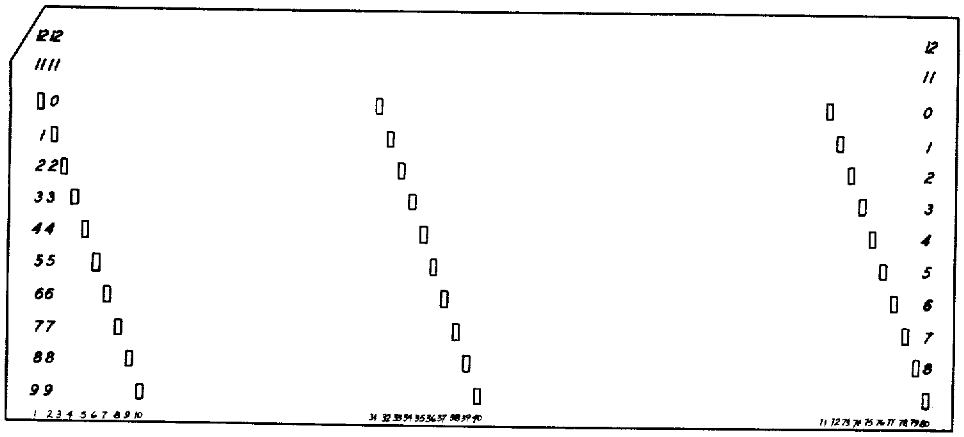
FIG. 2A illustrates a conventional business machine card used to control the transmission of input data to the circuits comprising the present invention.
Figures 3, 8:
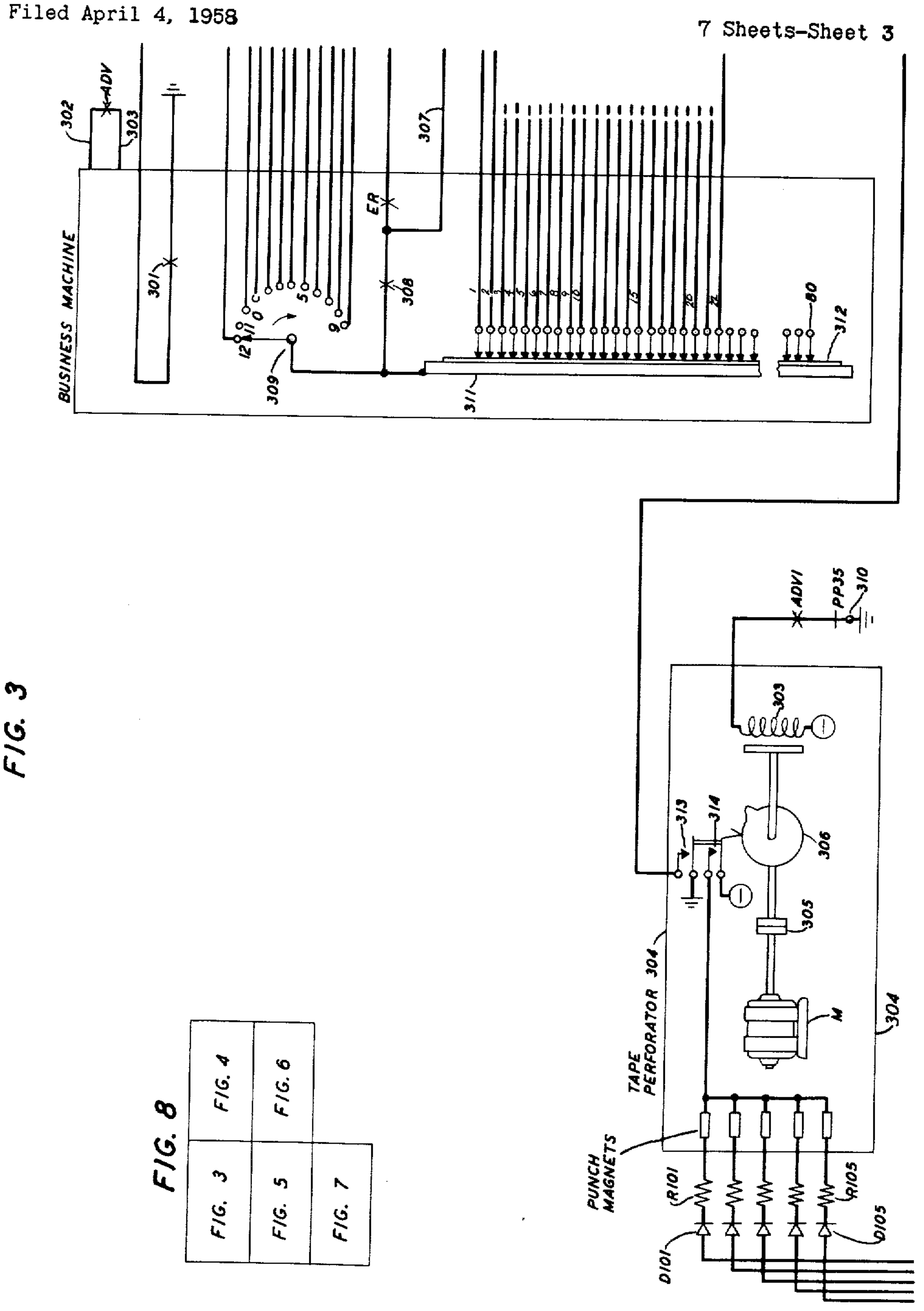

FIG. 2B contains a table showing the relationship between the decimal and the teletypewriter code;

FIGS. 3, 4, 5, 6, and 7 together comprise the detailed circuits of the present invention; and FIG. 8 shows how FIGS. 3, 4, 5, 6, and 7 should be arranged with respect to one another.

GENERAL DESCRIPTION

Figure 1:
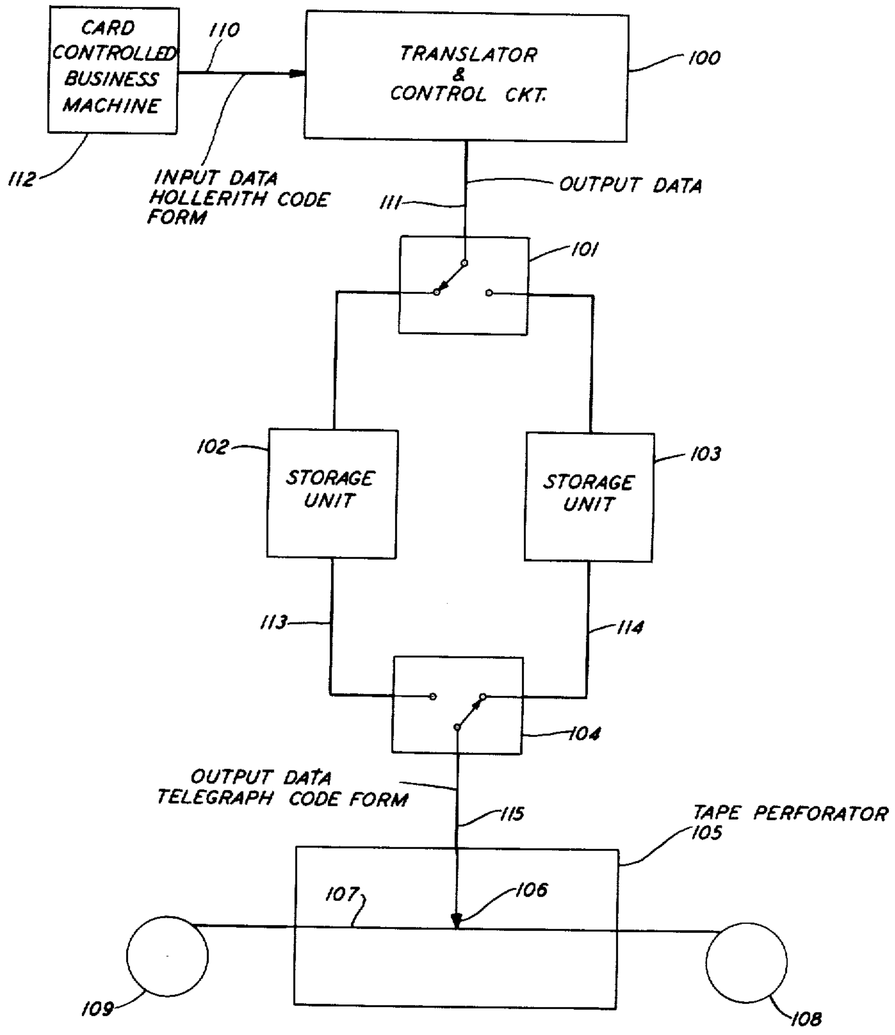
FIG. 1 illustrates in diagrammatic form the relationship between the various elements comprising the present invention.

FIG. 1 contains a diagrammatic showing of the relationship between the various circuit elements and components comprising the present invention. The cards containing the data to be perforated on tape are inserted in business machine 112 which may be of any type suitable for the purpose, such as, for example, the model 519 summary punch manufactured by the International Business Machines, Incorporated. This machine reads the cards row by row instead of column by column. Since each digit on the card is stored in an individual column, the reading of the cards row by row results in the data pertaining to the various digits on the card being obtained from the sensing brushes of the machine more or less simultaneously instead of sequentially as would be the case if the card were read column by column.

The above relationship may be readily understood from an inspection of the business machine card shown on FIG. 2A. This card has eighty vertical columns and twelve horizontal rows. Of the eighty columns, only columns 1 through 10, 31 through 40 and 71 through 80 are numbered in FIG. 2A. The twelve horizontal rows, beginning with the top of the card, are numbered 12, 11 and 0 through 9 in that order. Each column is used to store a single digit by perforating the horizontal row which represents the numerical value of the digit to be stored. Only rows 0 through 9 are normally used for digit storage. Rows 11 and 12 are sometimes used in conjunction with one of rows 0 through 9 for the storage of alphabetical or certain other information, as for example, asterisks, commas, periods, et cetera.

Many business machines sense or read cards in a column by column fashion, i.e., the cards move to the right as they are read by twelve brushes, one for each card row as shown in FIG. 2A. Since each column contains the representation of a single digit, it may be seen when the cards are read in this manner, the digital information will be read by the sensing brushes digit by digit as the brushes successively read columns 80 through 1 in that order. The digital information is commonly said to be obtained in a sequential manner from these machines.

Other business machines read the cards row by row, i.e., the cards pass the sensing brushes as they move upwardly from bottom to top in FIG. 2A. This type of sensing requires eighty brushes, one for each column. The information is commonly said to be obtained simultaneously from machines that utilize this type of sensing. This is true in spite of the fact that obviously all the information would not be obtained at the same exact instant of time unless each column on the card was perforated with the same digit. However, if eighty columns store the digits 0 through 9, it is obvious that many of them will contain the same digit and, therefore, some of the stored information will be presented simultaneously to the sensing brushes.

Each type of sensing, i.e., sequential and simultaneous, has certain advantages and disadvantages. The sequential type permits simpler receiving circuits since the circuit has to concern itself with only a single digit at a time. The disadvantage with this type of sensing is that it is slower since eighty separate columns must be read sequentially by the brushes.

The use of the simultaneous type of sensing, i.e., row by row, requires more complicated receiving circuits since a separate digit receiving means or storage device has to be provided for each of the eighty columns. This type of sensing is, however, faster than the column by column type since the card is only underneath the sensing brushes long enough for them to sense the information contained in twelve different positions (rows) instead of in eighty positions (columns).

The output information from business machine 112 is applied over cable 110 to translator and control circuit 100. The translator portion of circuit 100 translates the input information from the Hollerith code to a teletypewriter code and applies it to cable 111. The output information on cable 111 is fed to a switching circuit 101 whose position is controlled by the control portion of circuit 100. Switching circuit 101 is operable to connect either storage unit 102 or storage unit 103 with cable 111. Storage units 102 and 103 are identical and each provides a means for storing in teletypewriter code form the information derived from a single business machine card.

Each storage unit is also operable at the desired time to apply sequentially the stored information digit by digit to an output conductor 113 or 114 leading to switching circuit 104 whose position is also controlled by the control circuit portion of circuit 100. Switching circuit 104, depending upon the position it is in, connects either cable 113 or cable 114 with cable 115 leading to tape perforator 105. This perforator comprises a tape 107, tape reels 108 and 109, together with perforator magnets 106. Tape 107 is carried past the perforator magnets 106 which effect the perforation in a teletypewriter code form of the information applied to cable 115.

Two separate storage units 102 and 103 are provided in order to insure that business machine 112 will not have its operations slowed by an idle period of perforator 105. Perforator 105 perforates information sequentially while business machine 112 reads the cards row by row. It is obvious that it will take perforator 105 longer to perforate all the digital information for a card than it will take business machine 112 to read the card since a perforate operation requires more time than does a reading operation. This is due to the fact that the reading of a card only requires that it be rapidly moved or wiped across the sensing brushes while a perforate operation requires the tape to be stationary during the times it is engaged by the perforator punches. If only one storage unit such as, for example, storage unit 102 were provided, perforator 105 would remain idle once it finished its operation for a given card and could not recommence operation until storage unit 102 received all the information pertaining to the next card. Then, once business machine 112 fed all the information for this next card to storage unit 102, it would stop and remain idle until storage unit 102 fed all this information to perforator 105. Thus, the time required by business machine 112 to sense series of cards would be extended by the cumulative idle time of perforator 105.

The above is avoided by providing the second storage unit 103. The sequence of operations with this arrangement is as follows. Business machine 112 reads the first card and enters the information pertaining thereto into storage unit 102. Next, business machine 112 reads the second card and enters the information pertaining thereto into storage unit 103. However, during the time this information is being entered into storage unit 103, the information now in storage unit 102 is fed to perforator 105. Next, business machine 112 reads the third card and enters the information pertaining thereto into storage unit 102. While this is taking place, storage unit 103 is interconnected with tape perforator 105 and causes it to perforate the information stored therein and pertaining to the second card.

This cycle of operation continues as long as machine 112 reads cards. With this arrangement, tape perforator 105 is kept running as long as information is contained in either of storage units 102 or 103. The business machine is sufficiently fast so that it enters the information for a card into the storage unit long before the other storage unit has read out its information to the perforator. However, the whole process is much faster than it would be with one storage unit since the system operation is not slowed down by allowing the tape perforator to remain idle.

1. *Description of circuit operation*

1.1. *Registration in memory circuit A*

1.11. *Preparatory circuit operations*

Figure 4:
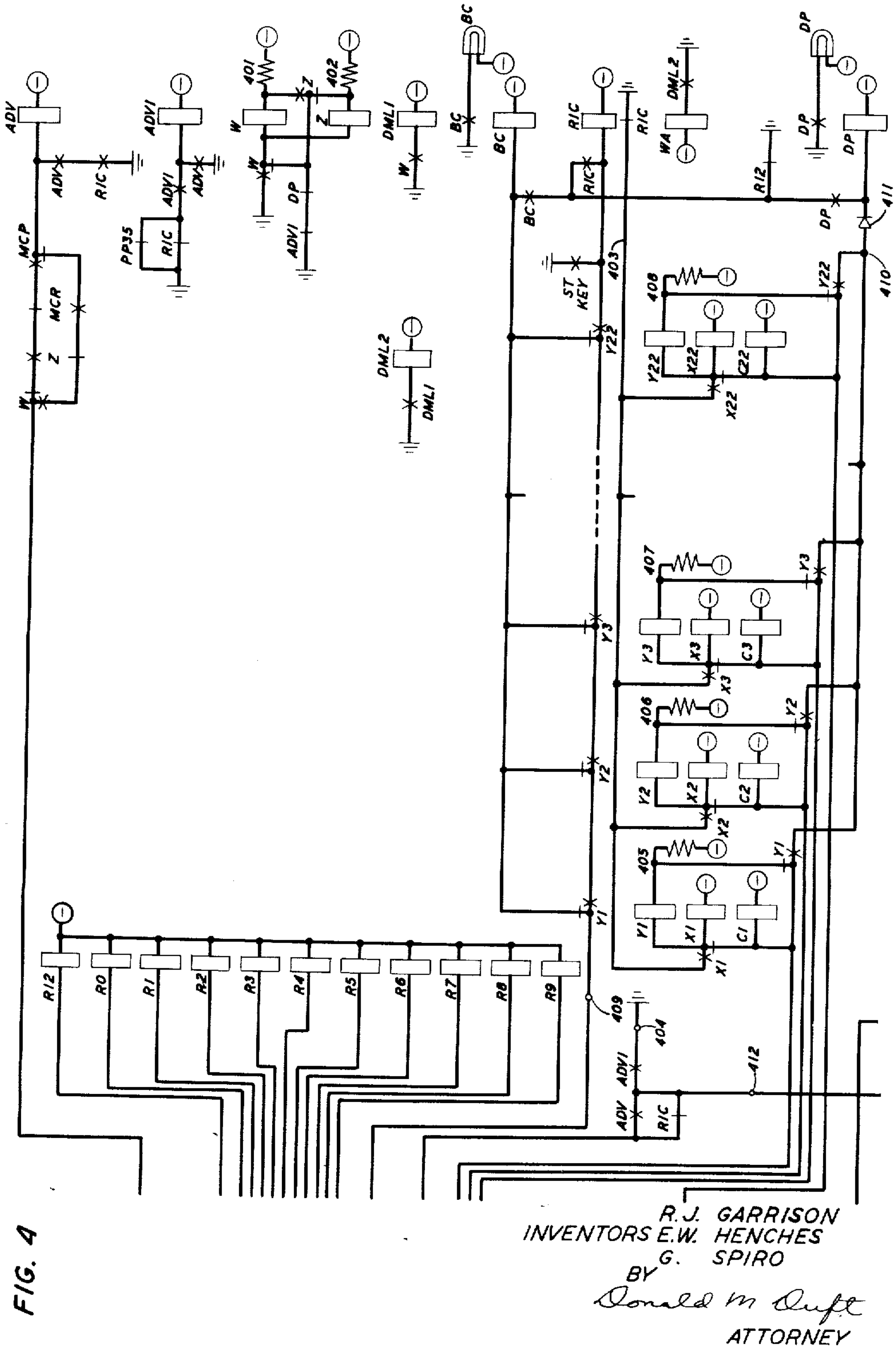
Figure 5:
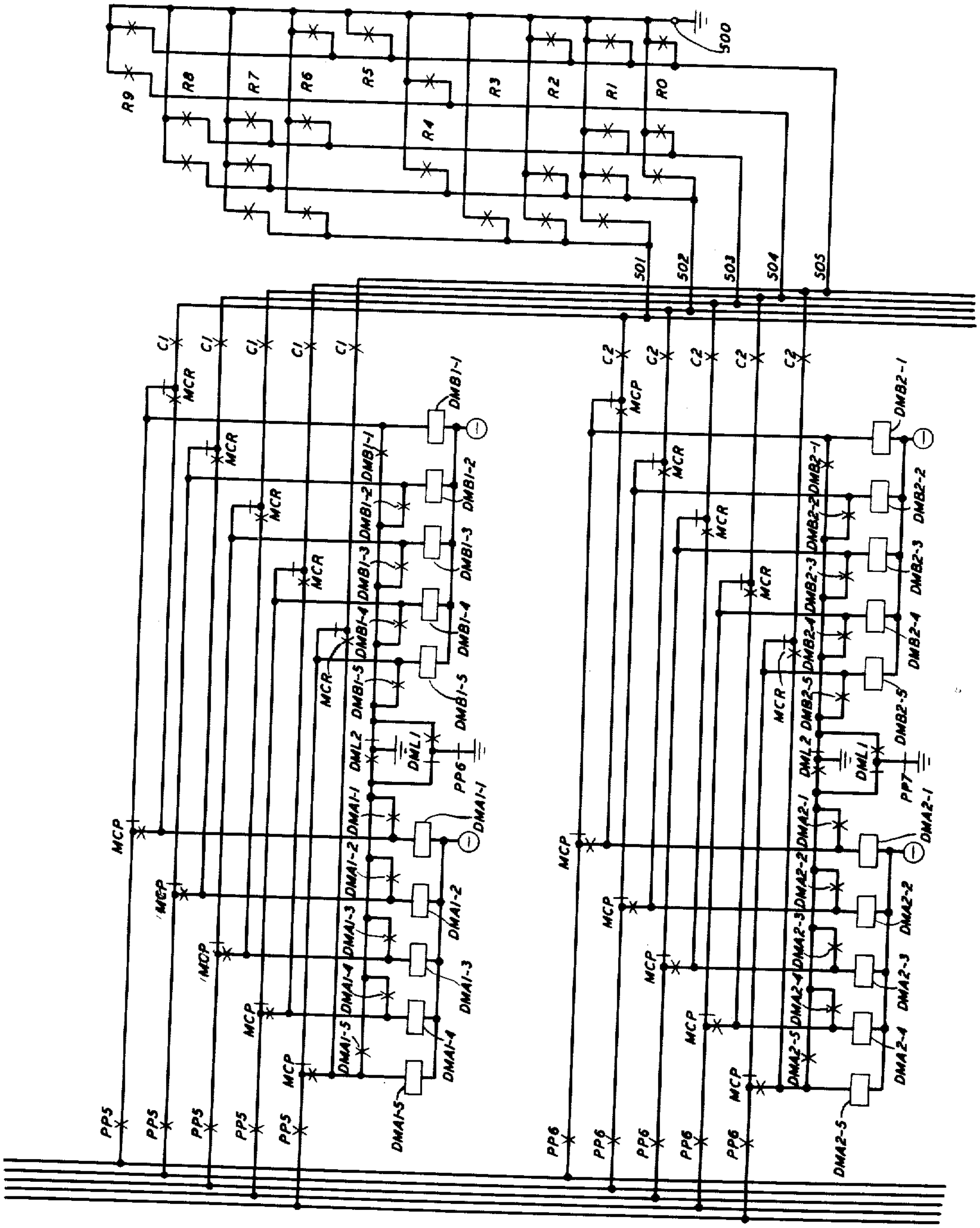

The circuit operation is initiated by applying power (represented by the battery and ground symbols on FIGS. 3 through 7) to the system and by momentarily operating the non-locking ST key (FIG. 4). The momentary operation of this key extends a ground to operate relay RIC (FIG. 4). Relay RIC operated closes a locking path for itself over a pair of its make contacts, through a pair of break contacts on relay R12, to ground. The operation of relay RIC also closes a path from ground through a different set of its make contacts to prepare a locking path for relay ADV (FIG. 4) when it subsequently operates.

The application of power to the circuit operates relay W (FIG. 4) over the path extending from ground, break contacts on relays ADV1, DP and W, through the winding of relay W, through resistor 401, to negative battery. The operation of relay W closes an obvious path to operate relay DML1 (FIG. 4) which, in turn, closes a path to operate relay DML2 (FIG. 4). Relay DML2 operated prepares a locking path for relays DMA1–1 through DMA1–5, DMA2–1 through DMA2–5, . . . DMA22–1 through DMA22–5 (FIGS. 5 and 7), which relays operate, as later described, to store the information received from the business machine and pertaining to the first card. This group of relays comprises the A memory unit and corresponds to storage unit 102 on FIG. 1. The corresponding relays DMB1–1 through DMB1–5, et cetera. (FIGS. 5 and 7) comprise memory unit B and correspond to storage unit 103 on FIG. 1.

Figure 6:
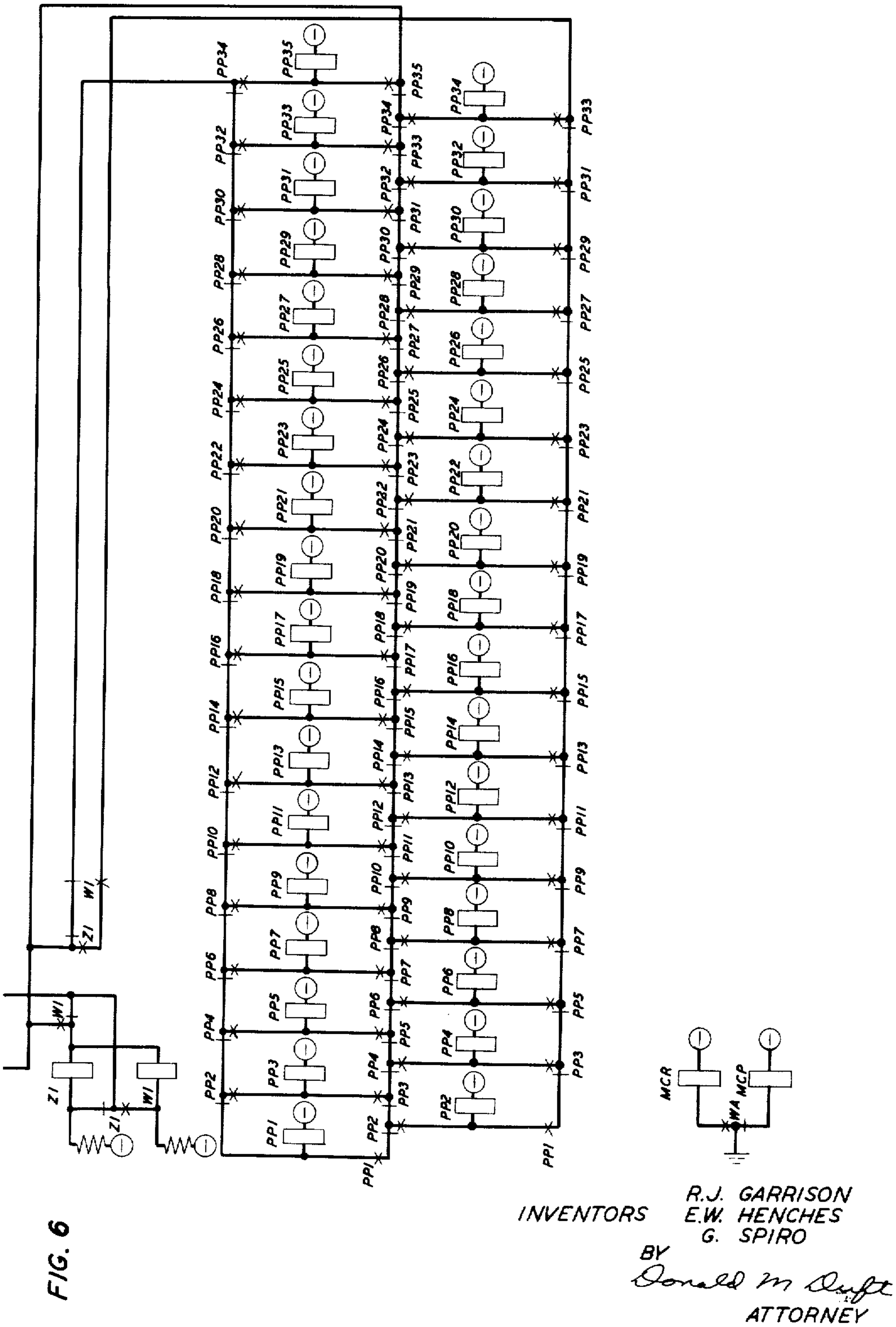
Figure 7:
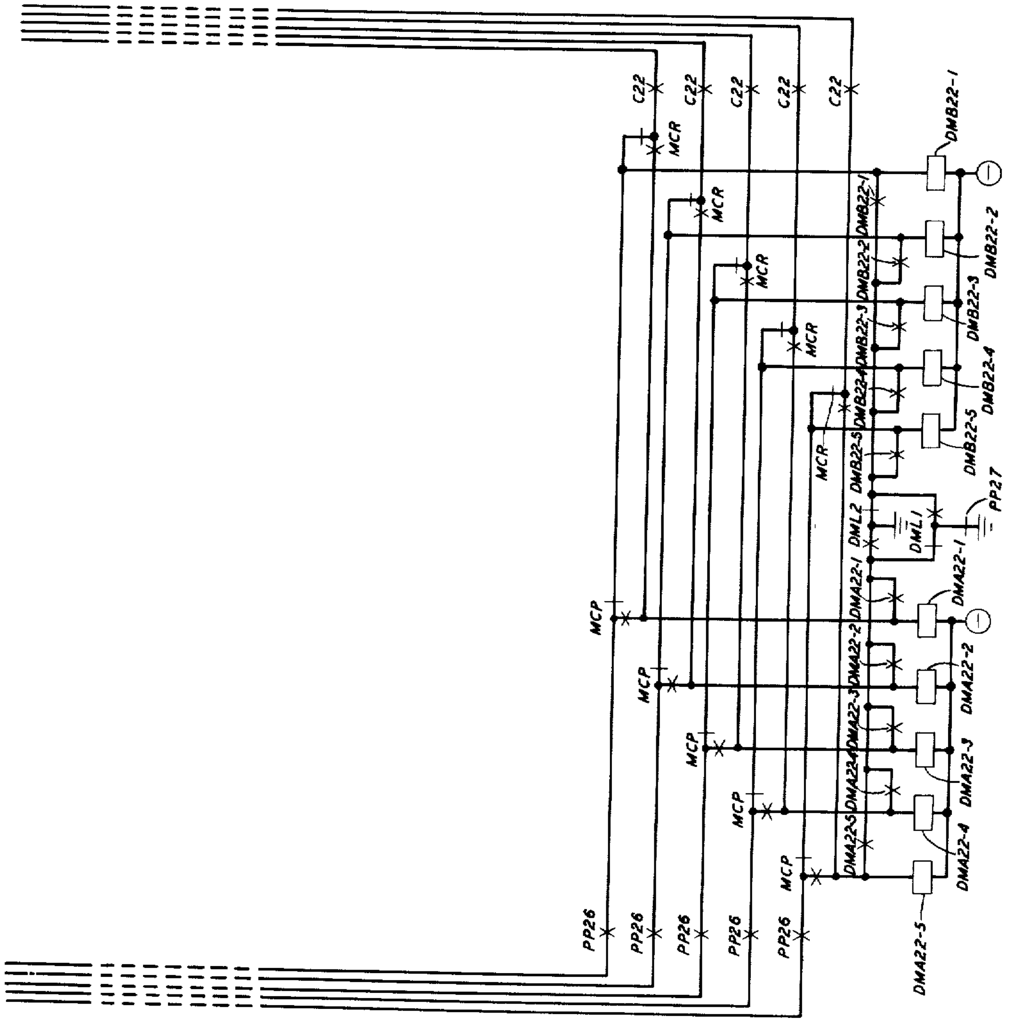

The operation of relay DML2 also closes an obvious path to operate relay WA (FIG. 4) which, in turn, closes an obvious path to operate relay MCR (FIG. 6).

A circuit is closed at this time from ground, through closed contact 301 in the business machine, through make contacts on relay W, break contacts on relay Z, make contacts on relay MCR, break contacts on relay MCP, to the winding of relay ADV (FIG. 4) which operates and locks over its make contacts to the locking ground hereinbefore described and provided by a set of make contacts on relay RIC. Make contacts 301 in the business machine are closed whenever the machine has finished reading one card and is ready to begin the reading to the following card. This provides a signal to the associated apparatus, such as for example, relay ADV (FIG. 4), that the business machine is idle and is awaiting the receipt of a start signal (described in the next paragraph) to begin the processing of the next card.

Make contacts on relay ADV operated interconnect leads 302 and 303 from the business machine. The interconnection of these two leads comprises the start signal for the machine and enables it to initiate operations concomitant with the processing of the next card.

The operation of relay ADV closes an obvious path over its make contacts to operate relay ADV1 which, in operating, closes a locking path for itself over its make contacts to ground through break contacts on relay PP35. Break contacts on relay RIC also comprise an additional holding circuit for relay ADV1 when relay RIC is normal.

Relay ADV1 operated extends a circuit from ground on terminal 310, through break contacts of relay PP35, through its own make contacts, to energize coil 303 of clutch 305. The energization of coil 303 closes clutch 305 so that motor M rotates cam 306. The detailed operation of the perforator is explained in detail hereinafter.

The opening of a set of break contacts on relay ADV1 removes the ground formerly supplied through break contacts on relay DP and relay Z to the left side of resistor 402 whereby relay Z (FIG. 4) now operates from battery through resistor 402, through its winding, through make contacts on relay W, to ground. The closure of a set of make contacts of relay ADV1 also closes a circuit from ground on terminal 404, break contacts on relays Z1, W1, and on the even numbered relays PP34 down through PP2 to operate relay PP1 (FIG. 6). The closure of make contacts of relay ADV1 also closes a circuit from ground on terminal 404, through make contacts of relay ADV operated, over conductor 307 and contacts 308 to emitter 309. The emitter and the operations associated therewith are described in detail hereinafter.

The operation of relay Z prepares a path from the left side of resistor 401, through make contacts of relay Z, to short circuit relay W when relay ADV1 subsequently releases. The operation of relay Z also opens its break contacts in the operating path for relay ADV (FIG. 4).

1.12. *Reading of the first card*

Emitter 309 of the business machine comprises an electromechanical device having rotor contact and twelve stationary contacts designated, clockwise, 12, 11 and 0 through 9. It provides a means for synchronizing the electrical read out of the card with its mechanical position during the reading cycle. The normal position of the rotor is just to the left (counterclockwise) of stationary contact 12. It is in this position when a card is not being read. The rotor sweeps over all the stationary contacts once during the reading of each card and engages the numbered stationary contacts at the same instant of time the correspondingly numbered row on the card is beneath the sensing brushes. For example, the rotor engages contact 12 when row 12 (the top row on the card of FIG. 2A) is beneath the sensing brushes. Next, the rotor engages stationary contact 11 as the card advances and row 11 is read by the sensing brushes. Similarly, the rotor successively engages each of contacts 0 through 9 as the sensing brushes successively engage the perforations in rows 0 through 9. As soon as the sensing brushes have read all the perforations on a card, the rotor returns to its normal position, one step counterclockwise of contact 12, preparatory to the reading of the next card. In summary, insofar as emitter 309 is concerned, it is only necessary to understand that it provides a means of applying a potential to each of contacts 12, 11 and 0 through 9 in that order simultaneously with the reading of the perforations in rows 12, 11 and 0 through 9 by the sensing brushes.

Make contacts 308 are a safety feature and are operated only when a card is in the sensing station. This insures that emitter 309 will never apply a signal to any of the stationary contacts unless a card is being read.

As the reading of the card by the business machine commences, the previously described ground on lead 307 is extended through contacts 308 and through the rotor of emitter 309 to stationary contact 12 as row 12 of the card passes beneath the sensing brushes. The ground on stationary contact 12 is extended over an obvious path to operate relay R12 (FIG. 4). The operation of relay R12 opens its break contacts in the locking circuit of relay RIC (FIG. 4) thereby releasing it.

The release of relay RIC closes a path over its break contacts to maintain ground on wire 307 when relay ADV subsequently releases. The release of relay RIC opens its make contacts and breaks the locking circuit for relay ADV (FIG. 4) which now releases. The release of relay RIC also closes its break contacts to hold relay ADV1 operated in the event that relay PP35 operates (which operates after all the information pertaining to a previously read card has been perforated in the tape) before the read in of information from the business machine is completed. The release of relay RIC applies a ground to lead 403 which prepares locking grounds for relay X1 through X22, and Y1 through Y22 as they operate when cards are read.

A plurality of column encoder circuits, comprising relays Y1–Y22, X1–X22, and C1–C22, is provided for registering the digits read by the sensing brushes and transmitted to the circuit of FIG. 4. Each individual encoder circuit, such as for example, relays X1, Y1, and C1, is associated with an individual sensing brush and effects the registration of the digit read by its sensing brush during the reading of a card. Relays Y1–Y22, X1–X22, and C1–C22 comprise twenty-two separate encoder circuits for registering twenty-two of the eighty digits on the card. Each encoder circuit may be arranged, by means of flexible interconnections, to receive output information from any selected column. It is assumed herein, for the purposes of simplicity, that encoder circuit 1, comprising relays Y1, X1 and C1, is associated with column 1 of the card while encoder circuits 2 through 22, comprising relays Y2–Y22, X2–X22 and C2–C22, are arranged to accept information from columns 2 through 22 on the card. The sensing brushes are shown on FIG. 3 below emitter 309. Eighty sensing brushes are shown, with brushes 1 through 22, respectively, being connected to the windings of relays C1 through C22, respectively. Brushes 23 through 80 are shown, diagrammatically in part, and are not connected to the encoder circuits.

The above-described relationship between the sensing brushes and the encoder circuits is one of many possible arrangements and is shown only for convenience in discussion so that the number of the sensing brush matches the number of the encoder circuit. Also, if desired, additional encoder circuits could be provided so that there would be a total of eighty, one for each sensing brush and hence, one for each column of the card. With such an arrangement, all the eighty possible digits on the card could be read and entered into the encoder circuits.

The card 312 moves in a plane perpendicular to FIG. 3 as it is sensed and in doing so forces itself between the sensing brushes and card plate 311. The card separates the sensing brushes from plate 311 as it passes through the sensing station, thereby breaking contact between them except for times in which the sensing brushes encounter perforations. At these times, the brushes enter the perforations and contact the plate 311.

The card moves past the sensing brushes in synchronism with emitter 309 so that the rotor grounds contacts 12, 11 and 0 through 9 in that order as card rows 12, 11 and 0 through 9 in that order pass beneath the sensing brushes. The present disclosure is only concerned with digital data, which is contained in rows 0 through 9 and, therefore, rows 12 and 11, which normally represent other than digital data, should not have any perforations therein.

The rotor of emitter 309 moves from contact 12 to contact 11 as the card advances so that row 11 is underneath the sensing brushes. Relay R12 (FIG. 4) releases when the rotor is disengaged from contact 12. No circuit actions are effected by its release at this time. Next, the rotor moves from contact 11 to contact 0 as the card advances whereby its row 0 is beneath the sensing brushes.

Let is be assumed at this time that column 1 contains the digit 0 and, therefore, has a perforation in its row 0 position. Sensing brush 1 enters this perforation and contacts plate 311 which is grounded at this time. The ground on sensing brush 1 is extended to the winding of relay C1 (FIG. 4) to operate it. The same ground is also extended through break contacts on relay X1 (FIG. 4) to operate it. Relay X1 in operating breaks its operating path and closes a locking path for itself to the ground on conductor 403. The ground on the left-hand side of relay Y1 (FIG. 4) does not operate it since the same ground is also applied through break contact Y1 to the right-hand side of the relay winding. Any other columns on the card having a perforation in their row 0 position will also operate their corresponding X– and C– relays at this time.

Relay R0 operated when the emitter rotor advanced from position 11 to position 0 thereby grounding contact 0. The operation of relay R0 closes its three contacts shown in the lower right-hand corner of FIG. 5 thereby closing a first circuit from ground on terminal 500 through make contacts on relay R0, over conductor 502, make contacts of relays C1 and relay MCR, to the winding of relay DMA1–2 (FIG. 5) to operate it. Another circuit is closed at this time from ground on terminal 500, through another set of make contacts of relay R0, over conductor 503, make contacts of relays C1 and MCR, to the winding of relay DMA1–3 to operate it. Another circuit is closed at this time from ground on terminal 500 through a third set of contacts on relay R0, over conductor 505, through make contacts on relays C1 and MCR, to the winding of relay DMA1–5 to operate it.

In summary so far, the simultaneous operation of relays R0 and C1 causes their make contacts to close and operate relays DMA1–2, DMA1–3, and DMA1–5. Relays DMA1–2, DMA1–3 and DMA1–5 operated close a locking path for themselves to ground through a set of end make contacts of relay DML2. These three operated relays represent the digits 2, 3, and 5 in the teletypewriter code shown in FIG. 2B, and in turn the digit 0 in the decimal code. Thus, these three relays now store the digit 0 read by the column 1 sensing brush.

If any other card columns had a perforation in their row 0 position, their associated relays X– and C– would now be operate and, in a similar manner, the operation of make contacts on relay R0 would effect the entry in teletypewriter code of the decimal digit 0 in their DMA– relays.

Next, the card advances another step to its row 1 position and simultaneously therewith, the rotor of the emitter engages contact 1 and operates relay R1. Relay C1 releases as the sensing brush 1 is disengaged from the perforaton in row 0 of column 1. The removal of the ground from sensing brush 1 removes the ground from the right-hand winding terminal of relay Y1 (FIG. 4), thereby permitting it to operate from the battery through resistor 405 since its left-hand winding terminal is grounded over the same path now holding relay X1 operated.

The operation of relay Y1 prepares a path over which terminal 409 is interconnected with the winding of relay RIC as is later described. The operation of relay Y1 also opens its make contacts to break one of the paths interconnecting terminal 409 with the winding of relay BC (FIG. 4) for reasons described hereinafter. The operation of relay Y1 also closes a path over its make contacts to interconnect sensing brush 1 with terminal 410 for reasons that are later described.

The card continues its travel past the sensing brushes and, in a manner similar to that already described, successively engages any perforations in rows 2 through 9 of the card. At the same time and in synchronism therewith, the rotor of the emitter successively engages each of contacts 2 through 9. As the rest of the rows on the card are read, relays R2 through R9 sequentially operate in combination with various ones of relays C2 through C22 to enter in teletypewriter code form the digital value of the perforations contained in each of the remaining card columns. Thus, for example, if card column 22 has a perforation in its row 8 position, relay C22 will be operated at the same time relay R8 operates and thereby close a plurality of paths from ground on terminal 500 to operate relays DMA22–2 and DMA22–3 and store in teletypewriter code form the decimal digit 8.

Contacts ER in the business machine operate after a card has been read and leaves the sensing station. The closure of these contacts extends the ground on conductor 307 to terminal 409. All of relays Y1 through Y22 are operated at this time provided that each of sensing brushes 1 through 22 encountered a perforation in its associated column as the card was read. Each column must be punched with either a digit representing pertinent information or a zero. No column is ever left unpunched and an unpunched column indicates a trouble condition. Therefore, once the card has been read and all of relays Y1 through Y22 are operated, the ground on terminal 409 is extended to operate relay RIC (FIG. 4).

The PP35 relay (FIG. 6) is operated at this time as is described hereinafter, thereby signifying that the perforation cycle for the previous card is completed. The break contacts of relay RIC open and remove ground from conductor 307 as relay RIC operates. Relay RIC operated locks to ground on the break contacts of relay R12 as hereinbefore described. The operation of relay RIC opens its break contacts which removes ground from conductor 403 thereby opening the holding path for relays Y1 through Y22 and X1 through X22 which now releases. The operation of relay RIC opens one of the holding paths for relay ADV1 (FIG. 4) which now releases providing that relay PP35 is operated. The operation of relay RIC closes its make contacts to prepare a holding path for relay ADV (FIG. 4).

Relay ADV1 (FIG. 4) released closes its break contacts which extend a ground through break contacts DP and make contacts of relay Z to the left-hand terminal of resistor 401, thereby short circuiting relay W and causin its release. Relay ADV1 released, effects the release of relay W1 (FIG. 6) in a manner described hereinafter. The release of relay ADV1 also effects the release of relay PP35 in a manner described hereinafter.

The release of relay W releases relay DML1 which, in turn, releases relay DML2. The release of DML1 closes its break contacts which provide a holding ground for all of the operated DMA– relays on FIGS. 5 and 7 to store the digital information read from the first card. The release of relay DML2 opens its make contacts and and breaks the holding path over which these same DMA– relays were previously held operated.

Relay DML2 released provides locking grounds over its break contacts for the DMB– relays which subsequently operate to store the information pertaining to the second card. Relay DML2 released also releases relay WA (FIG. 4).

Relay WA released releases relay MCR (FIG. 6) and operates relay MCP (FIG. 6). The release of MCR prepares a plurality of paths through its break contacts to interconnect the DMB– relays with the contacts of relays R0 through R9 so that they may be operated during the reading of the second card in a manner similar to that already described in connection with the first card. The operation of relay MCP interconnects the holding grounds on the operated DMA– relays with the perforator magnets in a manner described hereinafter so that the digits represented thereby will be perforated in the tape.

The registration of the information pertaining to the first card has not been completed and is represented by the operated DMA– relays. The clutch magnet was energized all the time relay ADV1 was operated and caused the advance of the tape. However, no information was perforated on the tape since the first card had just been read and, therefore, no information was contained in the DMB– relays at this time.

1.2. *Registration in memory circuit B*

1.21. *Preparatory circuit operations*

The description so far has discussed how the data on the first card read is entered into the A memory units comprising relays DMA1– through DMA22–. This section describes how the data on the second card read is entered into the B memory unit comprising relays DMB1– through DMB22–. At the same time the operations described in this section are taking place, the data now stored in the A memory unit controls the perforation of the output tape. These operations are described in detail in the next section.

The business machine now indicates it is ready to read the next card by closing contacts 301 and extending ground through break contacts on relay W, make contacts on relay Z, break contacts on relay MCR, and make contacts on relay MCP, to the winding of relay ADV (FIG. 4) to operate it. The operation of relay ADV operates relay ADV1 (FIG. 4) which closes a holding path for itself to ground on break contacts of relay PP35.

Relay ADV1 operated closes a ground from terminal 310, through break contacts of relay PP35, to energize the perforator clutch trip magnet, thereby preparing the perforator for punching the tape with the data now stored in the A memory unit. Relay ADV1 operated also releases relay Z. Relay ADV1 operated extends ground from terminal 404 through break contacts Z1 and W1 and through break contacts of even numbered relays PP34 through PP2 to operate relay PP1. Relay PP1 operated closes a locking path for itself through break contacts on relays PP2 through PP35, make contacts on relay ADV1 to ground on terminal 404. Make contacts on relay ADV1 operated extend ground from terminal 404 through make contacts on relay ADV to conductor 307.

The Z relay released opens the operating circuit for relay ADV (FIG. 4). However, this relay does not release since it remains operated over its holding circuit.

1.22. *Reading of the second card*

Relay ADV operated interconnects conductors 302 and 303 of the business machine which causes it to initiate the reading of the next card. The rotor of the emitter engages contacts 12 as the second card enters the sensing station thereby operating relay R12. The operation of relay R12 releases relay RIC as hereinbefore described. Relay RIC released prepares a path to maintain ground from terminal 404 on conductor 307 when relay ADV releases. Relay RIC released prepares a supplementary holding path for relay ADV1 and prepares a holding path for relays X1 through X22 in a manner similar to that already described in connection with the reading of the first card.

The second card proceeds past the sensing brushes and thereby causing the information thereon to be read and stored in the B memory circuits comprising relays DMB1–1 through DMB1–5, DMB2–1 through DMB2–5, . . . and DMB22–1 through DMB22–5.

The business machine transmits an end-of-reading signal by closing its contacts ER when the second card has been read. This signal applies a ground to terminal 409 which, in turn, is transmitted through make contacts on relays Y1 through Y22 in series to the winding of relay RIC to operate it. The RIC relay operated releases relay ADV1 upon the operation of relay PP35, thereby indicating the completion of the perforation cycle for the first card. The ADV1 relay released releases relays W1, PP35, and operates relay W.

Relay W operates upon the release of relay ADV1 and, in a manner similar to that already described, initiates circuit operations to effect the reading of the third card.

1.3. *Perforation of the paper tape*

The circuit operations described in this section take place immediately upon the entering of the data for the first card in the A memory unit. It was described in the beginning of section 1.2 how the start signal from the business machine to which operates relay ADV is extended through break contacts on relay W, make contacts on relay Z, break contacts on relay MCR, make contacts on relay MCP, to the winding of relay ADV which operates and, in turn, operates relay ADV1. It was also described in the beginning of that section how the operation of these two relays operates relay PP1 and also energizes the perforator clutch trip magnet. The operation of the trip magnet energizes clutch 305 which causes continuously running motor M to effect the rotation of the shaft and hence cam 306. Once every rotation of cam 306, the tooth thereon engages contacts 313 and 314 and causes them to close. The first closure of contacts 313 extends a ground to operate relay W1 which locks through its own make contacts and make contacts of relay ADV1 to ground on terminal 404. Relay Z1 does not operate at this time since it is short circuited due to the ground now on both sides of its windings. The shaft on which cam 306 is mounted continues its operation so that the tooth no longer engages the contacts. They open at this time and remove the operating ground for relay W1 and the short circuiting ground for relay Z1 thereby allowing it to operate. The operation of relays W1 and Z1 extends ground from terminal 412 through their contacts, through break contacts of odd numbered relays PP33 through PP3, make contacts of relay PP1 to operate relay PP2. The operation of this relay breaks the hereinbefore described holding path for relay PP1 to release it. On the next closure and opening of contacts 313, relays W1 and Z1 sequentially release and extend ground from terminal 412, through break contacts of relays W1 and Z1, break contacts of even numbered relays PP34 through PP4, make contacts of relay PP2, to operate relay PP3 which closes a holding path for itself through break contacts of relays PP4 through 35 to ground on terminal 412. The operation of relay PP3 releases relay PP2.

Relays PP1 through PP35 comprise a stepping chain whereby the relays operate sequentially beginning with the lowest numbered one as the motor shaft rotates and causes the tooth on cam 308 to close contacts 313. Accordingly, relay PP5 operates upon the fifth rotation of cam 306. The operation of relay PP5 closes its make contacts which interconnects the holding grounds on each of operated relays DMA1–1 through DMA1–5, through diodes D101 through D105, respectively, resistors R101 through R105, respectively, the windings of the punch magnets of the perforator unit, to negative battery on contacts 314. The operated ones of relays DMA1–1 through DMA1–5 have a holding ground applied to their windings from break contacts on relay DML1, through break contacts of relay PP6. These holding grounds are extended through the aforementioned circuit to the punch magnets to operate them in the same pattern in which the relays DMA1–1 through DMA1–5 are operated. This causes the punch magnets to operate and effect the perforation of the paper tape.

The next closure and opening of contacts 313 releases relay PP5 and operates relay PP6. The operation of relay PP6 breaks the holding path for the operated ones of relays DMA1–1 through DMA1–5, thereby causing them to release. The operation of relay PP6 also interconnects the grounds on the operated ones of relays DMA2–1 through DMA2–5 with the punch magnets to cause them to perforate the digit represented thereby on the paper tape. The release of relay PP5 disconnects relays DMA1–1 through DMA1–5 from the punch magnets.

The operation of the perforator continues in the above-described manner so that the punch magnets are sequentially connected with relays DMA3– through DMA22– in that order as cam contacts close and open upon each rotation of cam 306. This causes the digits stored in the operated combinations of relays DMA3– through DMA22– to be perforated sequentially on the paper tape. For example, the digit represented by the operated ones of relays DMA22–1 through DMA22–5 is perforated in the paper tape as relay PP26 operates upon the twenty-sixth rotation of cam 306 and interconnects the holding grounds on the operated ones of these relays with the punch magnets.

Relay PP26 releases and relays PP27 through 35 sequentially operate upon the remaining rotations of cam 306. The operation of relay PP35 breaks the operating path for the clutch trip magnet thereby releasing it and stopping any further rotation of cam 306.

No perforations are made on the paper tape during the operations of relays PP1 through PP4 and PP27 through PP35 in order to provide a blank portion between the perforations representing the digits pertaining to each card.

The operation of relay PP35 releases relay ADV1 upon the operation of relay RIC. The translator circuit is now in condition to enter the information read from the third card into the A memory unit and to interconnect the operated relays of the B memory unit with the perforator for perforation of the digits from the second card read.

The system operation continues in this manner with the translator simultaneously entering the output of the business machine into one memory unit while the data stored in the other memory unit is controlling the operation of the tape perforator.

1.4. *Detection of defective cards*

It has already been mentioned how digital information is represented on the cards by a single perforation in one of row positions 0 through 9 for each column depending upon the value of the digit. Defective cards may be encountered having either no perforation in a column or having two or more perforations. The present circuit provides means for detecting both of these defects.

It has already been discussed how each of relays Y1 through Y22 operate when their associated sensing brushes encounter a perforation. These relays when operated, lock to ground on conductor 403. Since each Y– relay operates and locks upon the reading of the first perforation in its column, the reading of a second perforation in the same column represents a trouble condition. Assume that a second perforation is encountered in column 1. At the time this second perforation is read, relays Y1 and X1 are operated and locked from the reading of the first perforation. A circuit is then closed from ground on sensing brush 1, through make contacts on relay Y1, through diode 411, to the winding of relay DP (FIG. 4) which operates and energizes a light to indicate a trouble condition. Break contacts on relay DP operate at this time and open the operating path for relays W and Z so that they do not operate on the next cycle and thereby stop the machine.

Each of relays Y1 through Y22 should be operated and locked to ground on conductor 403 by the time row 9 of the card has been read. If, due to a trouble condition, a card column is read having no perforation, the associated Y– relay for that column will not be operated as the card leaves the sensing station. Assume, for example, that column 2 of a card has no perforation. As the card leaves the sensing station relay Y2 will be unoperated while relays Y1 and Y3 through Y22 will be operated. The closure of contacts ER in the business machine, which comprises the end of card reading signal, extends a ground from conductor 307, through terminal 409, make contacts of relay Y1, break contacts of relay Y2 to the winding of relay BC to operate it. The operation of relay BC energizes a light to signify a trouble condition. Relay RIC cannot operate from ground on the ER contacts since its operating path is open at the make contacts of the Y2 relay normal. Relay RIC normal leaves relay ADV1 locked operated and prevents further operation of the translator.

It is to be understood that the above-described arrangements are but illustrative of the application of the principles of the invention. Numerous other arrangements may be devised by those skilled in the art without departing from the spirit and scope of the invention.

What is claimed is:

1. In a circuit for detecting the absence of a perforation in any of a plurality of record columns each of which should have a perforation contained therein, a plurality of sensing means each of which is associated with an individual column on the record and detects the presence of a perforation therein as the record travels past said sensing means, a plurality of operable means each of which is individually associated with one of said sensing means and operable thereby as its sensing means detects the presence of a perforation in its associated record column, a source of potential, an alarm means, a plurality of paths interconnecting said source of potential and said alarm means, said plurality of paths being equal in number to said operable means and each of said paths comprising a circuit interrupter associated with each of said operable means, and means operable upon the end of sensing of each record to cause said source of potential to operate said alarm means over the circuit interrupter associated with any of said operable means which are unoperated at the time.

2. In a circuit for detecting the presence of an additional and unwanted perforation in any of a plurality of record columns each of which should contain only a single perforation, a sensing means associated with each record column for detecting the presence of a perforation as the record travels past said sensing means, a plurality of responsive means each of which is individually associated with one of said sensing means and each of which is operated as its associated sensing means detects the presence of a first perforation in its associated record column, an alarm means, means operated by each of said responsive means to connect said alarm means with each of said sensing means after each sensing means has detected the first perforation in its associated column whereby the detection of a second perforation by any of said sensing means actuates said alarm means.

3. In a data storage and translation system, means for reading row by row the perforations on a record card having rows and columns wherein the location of a perforation in a column manifests the identity of the character represented thereby, said means for reading including a sensing brush for each card column for detecting any perforations contained therein, a first switching means individual to each sensing brush and operable as its brush engages a perforation, a second switching means having an operable position individual to each card row, means whereby said second switching means successively assumes its operable positions in synchronism with the reading of said card by said sensing brushes, a register individual to each card column, a translator operable in response to the operation of said second switching means to produce a unique output indication for each operable position assumed thereby, each of said indications representing an individual one of said card characters, and means whereby the simultaneous operation of said first and second switching means selectively operates said registers to store in a translated code form the character represented by any card perforation currently engaged by said sensing means.

4. In a data storage and translation system, means for reading row by row the perforations on a record card having rows and columns wherein the location of a perforation in a column manifests the identity of the character represented thereby, said means for reading including a sensing brush for each column for detecting any perforations contained therein, a first switching means individual to each sensing brush and operable as its brush engages a perforation, a second switching means having an operable position individual to each card row, means whereby said second switching means successively assumes its operable positions in synchronism with the reading of said card by sensing brushes, a register individual to each card column, a translator operable in response to the operation of said second switching means to produce a unique output indication for each operable position assumed thereby, each of said output indications representing one of said card characters, means whereby the operation of any one of said first switching means operates its associated register to store in a translated code form the character represented by the current output indication of said translator, a recorder having an input circuit and means whereby said registers sequentially apply the data stored therein to said input circuit for recording by said recorder.

5. In a data storage and translation system, means for reading row by row the perforations on a record card having rows and columns wherein the location of a perforation in a column manifests the identity of the character represented thereby, said means for reading including a sensing brush for each column for detecting any perforations contained therein, a first switching means individual to each sensing brush and operable as its brush engages a perforation, a second switching means having an operable position individual to each card row, means whereby said second switching means successively assumes its operable positions in synchronism with the reading of said card by said sensing brushes, a register individual to each card column, a translator operable in response to the operation of said second switching means to produce a unique output indication for each operable position assumed thereby, each of said output indications representing an individual one of said card characters, and means whereby the operation of said first switching means operates its register to store in a translated code form the character represented by the current output indication of said translator.

6. In a data storage and translation system, means for reading row by row the perforations on a record card having rows and columns wherein the location of a perforation in a column manifests the identity of the character represented thereby, said means for reading including a sensing brush for each column for detecting any perforations contained therein, a first switching means individual to each sensing brush and operable as its brush engages a perforation, a second switching means having an operable position individual to each card row, means whereby said second switching means successively assumes its operable positions in synchronism with the reading of said card by said sensing brushes, a register individual to each card column, a translator operable in response to the operation of said second switching means to produce a unique output indication for each operable position assumed thereby, each of said output indications representing an individual one of said card characters, means whereby the operation of said first switching means operates its register to store in a translated code form the card character represented by the current output indication of said translator, a recorder, means whereby said registers sequentially apply the data stored therein to said recorder for recording, a timing means operated by said recorder, and means whereby said timing means effects the release of each register after the data stored therein has been applied to said recorder.

7. In a data storage and translation system, a plurality of input circuits for receiving within a predetermined time duration a set of data signals representing different characters with the identity of each character being determined by the particular time within said duration that the signal representing each character is received, means for translating said received data into a different code form, an output circuit, and means operable only after an entire set of data has been received for sequentially applying said translated data character by character to said output circuit.

8. In a data storage and translation system, a plurality of input circuits for receiving within a predetermined time duration a set of data signals representing different characters with the identity of each character being determined by the particular time within said duration that the signal representing each character is received, storage registers, means responsive to the reception of said data for translating it into a different code form, means responsive to the reception and translation of said data for entering it into said registers, an output circuit, and means operable only after an entire set of data has been received whereby said registers apply said translated data sequentially character by character to said output circuit.

9. In a data storage and translation system, a plurality of input circuits for receiving within a predetermined time duration a set of data signals representing different characters with the identity of each character being determined by the particular time within said duration that the signal representing each character is received, means for translating said received data into a different code form, a recorder, and means operable only after an entire set of data has been received for sequentially applying said translated data character by character to said recorder for recording on an output medium.

10. In a data storage and translation system, a plurality of input circuits for receiving within a predetermined time duration a set of data signals representing different characters with the identity of each character being determined by the particular time within said duration that the signal representing each character is received, means for translating said received data into a different code form, an output circuit, means operable only after an entire set of data has been received for applying said translated data sequentially character by character to said output circuit, and means controlled by said output circuit for sequentially recording said translated data.

11. In a data storage and translation system, a plurality of input circuits for receiving within a predetermined time duration a set of data signals representing different characters with the identity of each character being determined by the particular time within said duration that the signal representing each character is received, storage registers, means responsive to the reception of said data for translating it into a different code form, means responsive to the reception and translation of said data for entering it into said registers, a recorder, and means operable only after an entire set of data has been received whereby said registers apply said translated data sequentially character by character to said recorder for recording on an output medium.

12. In a data storage and translation system, a plurality of input circuits for receiving within a predetermined time duration a set of data signals representing different characters with the identity of each character being determined by the particular time within said duration that the signal representing each character is received, means for applying successive sets of data signals to said input circuits, means for translating each received set of data into a different code form, a first and a second storage medium, an output circuit, means operable for applying to said first storage medium the translated data representing the first received set of data, means for applying to said output circuit sequentially character by character the data in said first storage medium, means concurrently operable with said last-named means for applying to said second storage medium the translated data representing the second received set of data, and means operable for applying to said output circuit sequentially character by character the data in said second storage medium as said first storage medium receives the translated data representing a third received set of data.

13. In a data storage and translation system, a plurality of input circuits for receiving within a predetermined time duration a set of data signals representing different characters with the identity of each character being determined by the particular time within said duration that the signal representing each character is received, means for applying successive sets of data signals to said input circuits, means for translating each received set of data into a different code form, a first and a second storage medium, an output circuit, means operable for applying to said first storage medium the translated data representing the first received set of data, means for applying to said output circuit sequentially character by character the data in said first storage medium, means concurrently operable with said last-named means for applying to said second storage medium the translated data representing the second received set of data, and means operable for applying to said output circuit sequentially character by character the data in said second storage medium as said first storage medium receives the translated data representing a third received set of data, and means controlled by said output circuit for sequentially recording the data applied thereto.

14. In a data storage and translation system, a plurality of input circuits for receiving within a predetermined time duration a set of data signals representing different characters with the identity of each character being determined by the particular time within said duration that the signal representing each character is received, means for applying successive sets of data signals to said input circuits, means for translating each received set of data into a different code form, a first and a second storage medium, an output circuit, means for applying to alternate ones of said storage media the translated data representing successive sets of said received data, and means whereby each storage medium applies the translated data stored therein to said output circuit sequentially character by character as the other storage medium receives the translated data for the next received set of data.

15. In a data storage and translation system, a plurality of input circuits for receiving within a predetermined time duration a set of data signals representing different characters with the identity of each character being determined by the particular time within said duration that the signal representing each character is received by each input circuit, means for applying successive sets of data signals to said input circuits, means for translating each received set of data into a different code form, a first and a second storage medium, an output circuit, means for applying to alternate ones of said storage media the translated data representing successive sets of received data, means whereby each storage medium applies the translated data stored therein to said output circuit sequentially character by character as the other storage medium receives the translated data for the next received set of data, and means under control of said output circuit for recording the data applied thereto.

References Cited in the file of this patent

UNITED STATES PATENTS

| | | |
|---|---|---|
| 2,636,672 | Hamilton | Apr. 28, 1953 |
| 2,702,380 | Brustman | Feb. 15, 1955 |
| 2,907,003 | Hobbs | Sept. 29, 1959 |